March 15, 1960  C. R. GOLLNICK  2,928,562
REFUSE COLLECTING AND TRANSPORTING EQUIPMENT
Filed Nov. 14, 1955  5 Sheets-Sheet 1
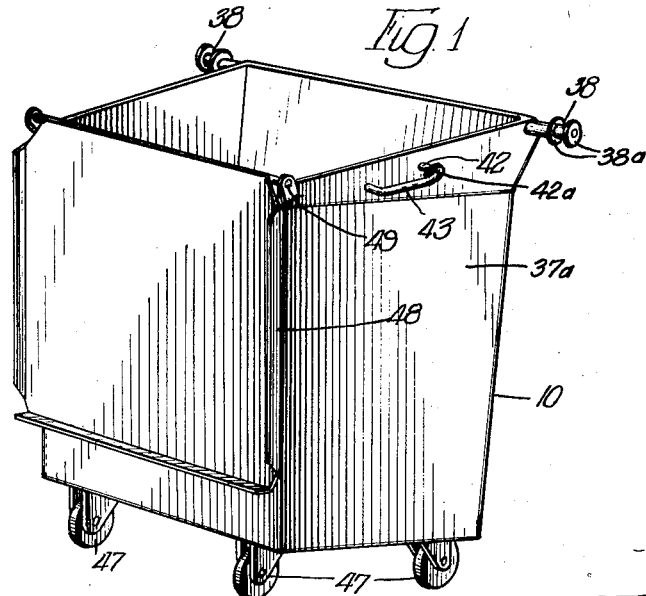
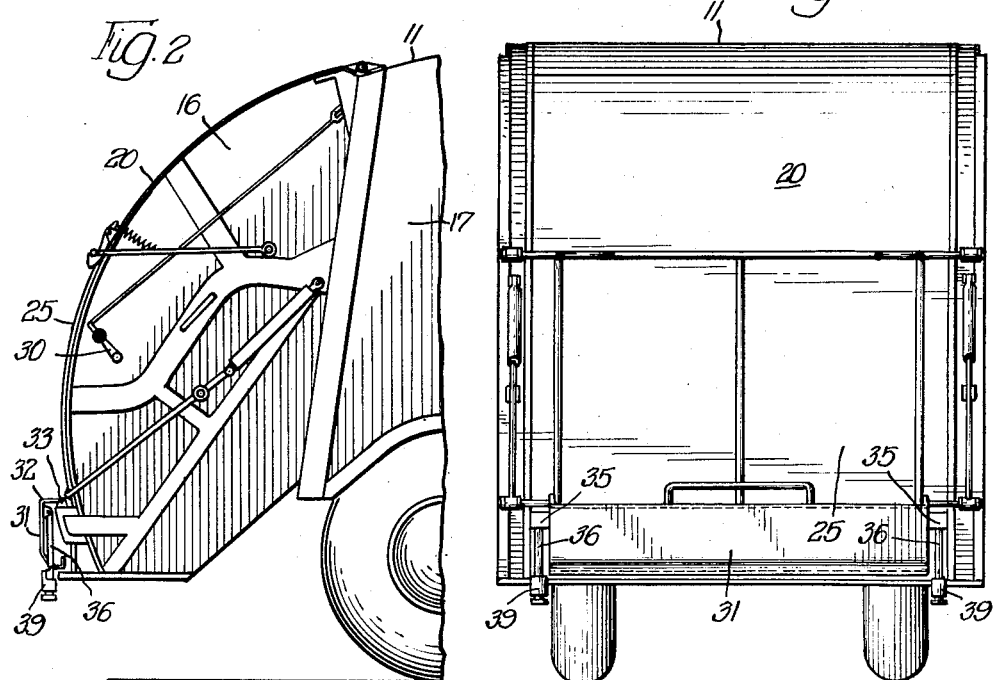
INVENTOR.
Cyril R. Gollnick,
BY
Cromwell, Greist & Warden
ATTYS March 15, 1960 — C. R. GOLLNICK — 2,928,562
REFUSE COLLECTING AND TRANSPORTING EQUIPMENT
Filed Nov. 14, 1955 — 5 Sheets-Sheet 2
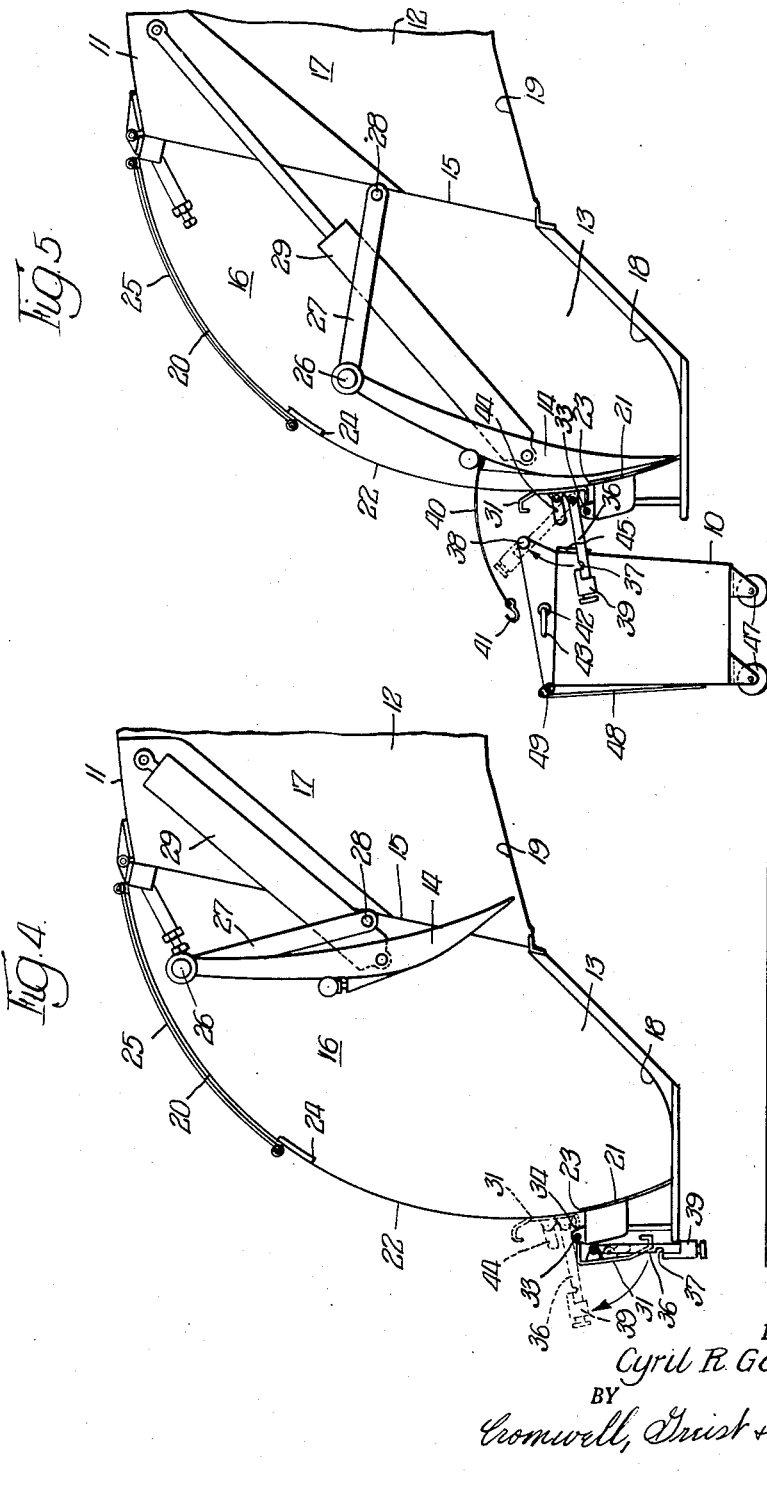
INVENTOR.
Cyril R. Gollnick,
BY
Cromwell, Greist & Warden
Attys.

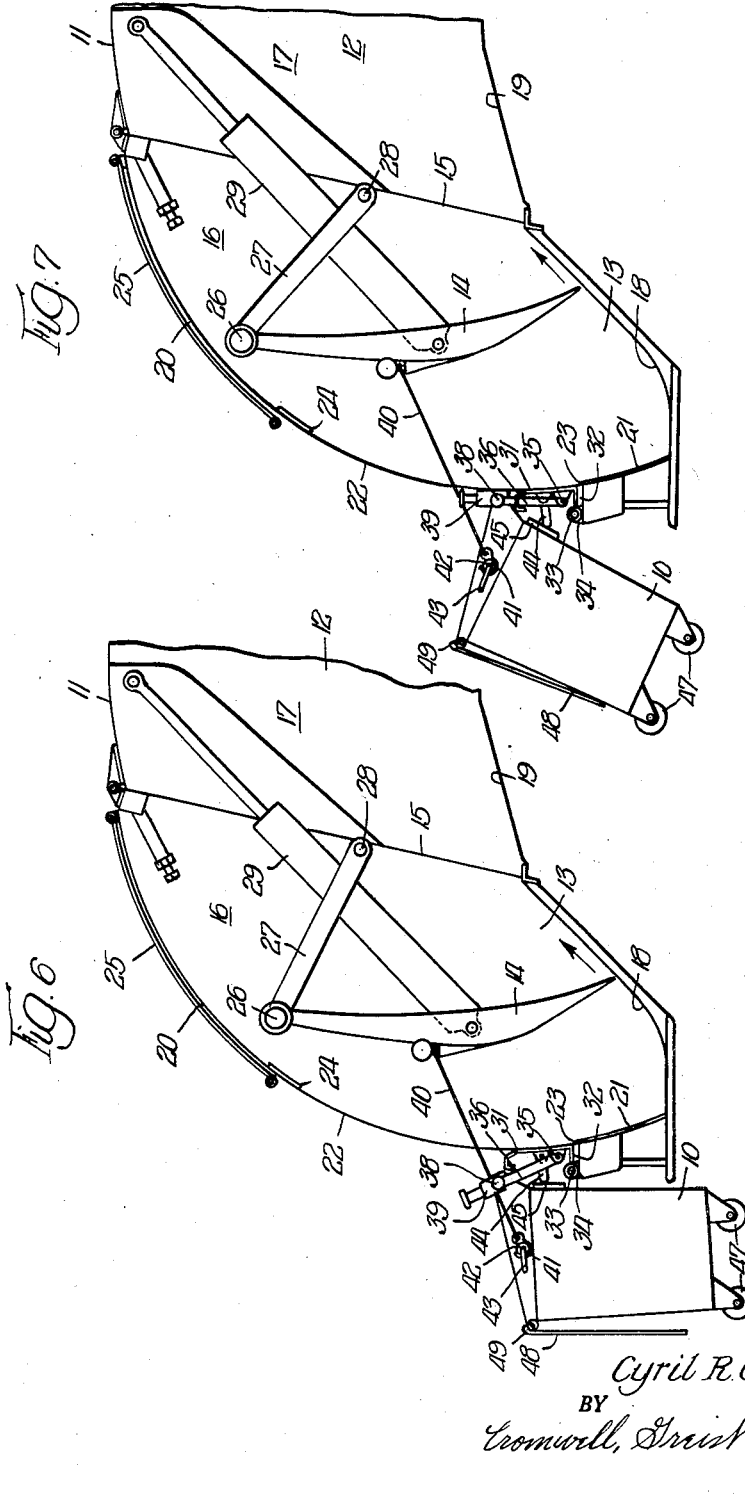

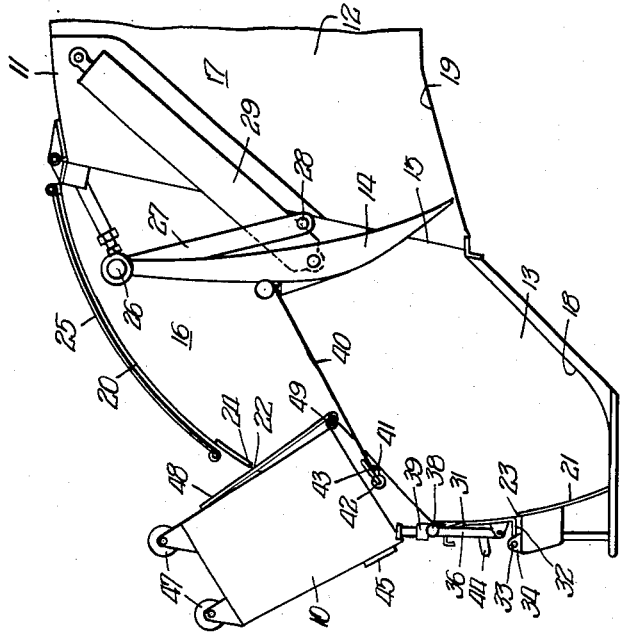
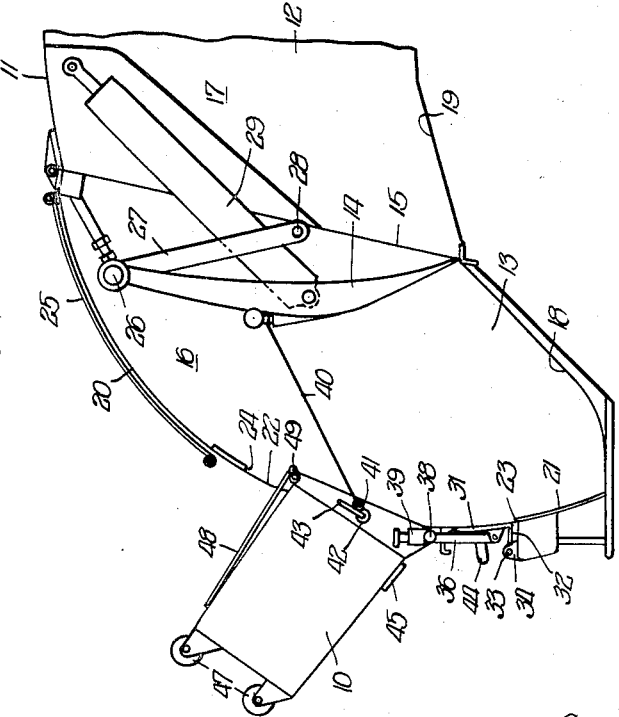

March 15, 1960 C. R. GOLLNICK 2,928,562
REFUSE COLLECTING AND TRANSPORTING EQUIPMENT
Filed Nov. 14, 1955 5 Sheets-Sheet 5
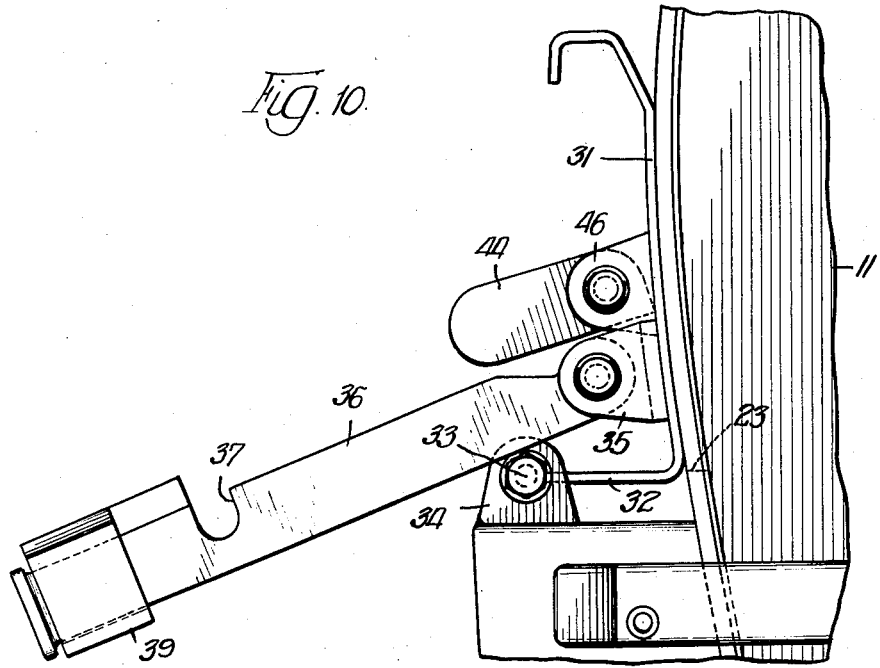
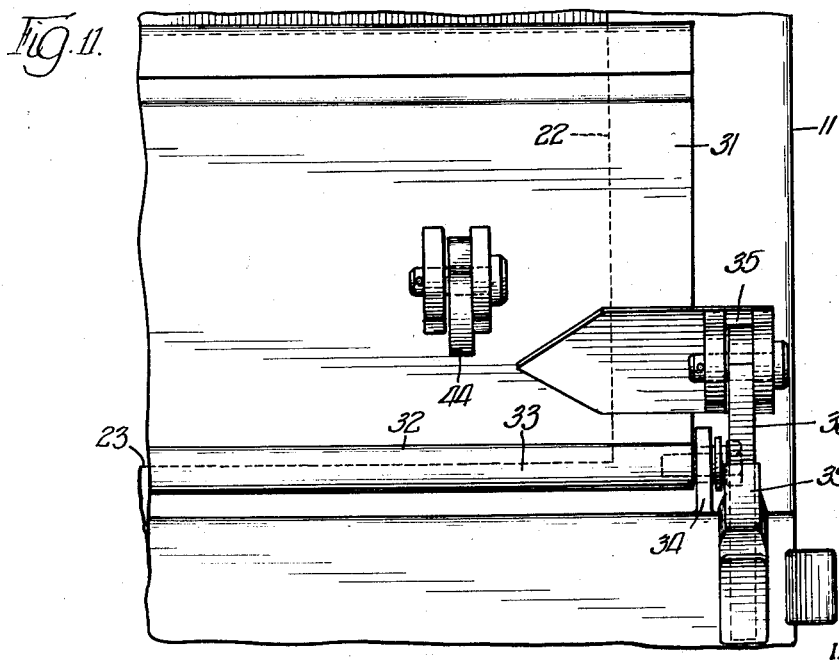
INVENTOR.
Cyril R. Gollnick,
BY
Cromwell, Greist + Warden
Attys

United States Patent Office 2,928,562
Patented Mar. 15, 1960

2,928,562

REFUSE COLLECTING AND TRANSPORTING EQUIPMENT

Cyril R. Gollnick, Oshkosh, Wis., assignor to Leach Company, Oshkosh, Wis., a corporation of Wisconsin Application November 14, 1955, Serial No. 546,340

13 Claims. (Cl. 214—302)

This invention relates to refuse collecting and transporting equipment, and has to do particularly with a mobile collecting container for detachable connection with and operation by a self-loading refuse vehicle.

One of the objects of the invention is to provide a new and improved mobile collecting container which is adapted to be detachably connected with a self-loading refuse vehicle and which, when the loading mechanism of the vehicle is operated, will be raised and tilted to cause its contents to be deposited in the receiving hopper of the vehicle.

Another object of the invention is to provide a self-loading vehicle having new and improved means for detachably connecting a mobile collecting container with the vehicle and for raising and tilting the connected container to cause the contents of the latter to be deposited in the receiving hopper of the vehicle.

While the foregoing statements are indicative in a general way of the nature of the invention, other objects and advantages will be evident to those skilled in the art upon a full understanding of the construction, arrangement and operation of the new equipment.

A preferred embodiment of the invention is presented herein by way of exemplification, but it will of course be appreciated that the invention is capable of incorporation in other structurally modified forms coming equally within the scope of the appended claims.

In the accompanying drawings,

Fig. 1 is a perspective view of a collecting container constructed in accordance with the invention;

Fig. 2 is a fragmentary side view of the rear end only of a self-loading refuse vehicle, which vehicle incorporates features which also form a part of the invention;

Fig. 3 is a rear view of the vehicle;

Figs. 4 to 9, inclusive, are a series of schematic views which show the way in which the container is detachably connected with the vehicle and manipulated by the loading mechanism of the vehicle;

Fig. 10 is a fragmentary side view of the rear end of the vehicle at the location of the container connecting means; and Fig. 11 is a fragmentary rear view of the portion of the vehicle shown in Fig. 10.

As will be observed in the drawings, a mobile collecting container 10 is provided for use in conjunction with a self-loading refuse vehicle 11.

While the invention is not limited in its application to the use of this container with any particular type of vehicle, as long as the vehicle is of such character that it can be used to manpulate the container in the manner hereinafter described, a vehicle of the type disclosed in Patent No. 2,649,216 can advantageously be used and has therefore been selected for the purpose of illustration.

It will be understood from the disclosure in that patent, which by reference is made a part of this disclosure, that the vehicle 11 is provided wtih a large storage chamber 12 and with a receiving hopper 13 which is located at the rear end of the storage chamber in open communication with the latter. The refuse which is to be stored in the chamber 12 is first deposited in the hopper 13 and is thereafter transferred from the hopper to the chamber by means of a movable plate 14, which plate in transferring the refuse sweeps the bottom of the hopper and in its position of rest closes off a passageway 15 which is located between the hopper and the compartment.

The portion 16 of the vehicle which houses the hopper 13 is pivotally connected at its upper front edge to the rear edge of the portion 17 of the vehicle which houses the storage compartment, whereby to permit the portion 16, with the transfer plate 14 and its associated mechanism, to be swung rearwardly and upwardly in an arc into an out-of-the-way position to facilitate unloading of the storage chamber, but this feature has nothing to do with the improvements which constitute the present invention.

The bottom 18 of the hopper 13 slopes upwardly and forwardly toward the bottom 19 of the compartment, and the rear wall 20 of the portion 16 of the housing which encloses the hopper is provided, immediately above the rear end 21 of the hopper, with a large rectangular opening 22. The opening 22 extends substantially the full width of the hopper, from a relatively low sill 23 at the upper edge of the rear end 21 of the hopper to a header 24 which forms the top of the opening 22. The rear wall 20 of the portion 16 of the vehicle which contains the opening 22 is curved and is provided with a correspondingly curved door 25 which is movable downwardly in an arc from an elevated out-of-the-way position into a lowered position wherein it will close off the opening 22 when the vehicle is not being loaded.

The transfer plate 14 is pivotally connected at its upper end 26 with the upper ends of links 27 which are in turn pivotally connected at their lower ends 28 to the vehicle, and the plate is moved in a predetermined path by hydraulic cylinders 29 which act on the plate intermediate the upper and lower ends of the latter, all as illustrated and described in Patent No. 2,649,216.

The plate 14 is shown in Fig. 4 in its normal position of rest, in which position it closes off the passageway 15 between the chamber 12 and the hopper 13. When the hydraulic cylinders 29 are placed in operation by a suitable conveniently located hand control 30 the links 27 will remain stationary in the upright position shown in Fig. 4 until the lower end of the plate 14 has swung rearwardly in an arc over whatever refuse has been deposited in the hopper, and until the plate has reached a position above the rear end 21 of the hopper, after which the continuing operation of the hydraulic cylinders will cause the plate to shift downwardly, as shown in Fig. 5, into substantial engagement with the rear part of the bottom 18 of the hopper, behind the refuse which had previously been deposited in the hopper. Continuing operation of the hydraulic cylinders 29 in the reverse direction will then cause the plate 14 to move rearwardly and upwardly in substantial conformity with the bottom of the hopper, through the progressive positions shown in Figs. 6, 7, 8 and 9, at the end of which movement the loading cycle will have been completed and the plate 14 will come to rest again in its initial position, which is shown in Fig. 9 and also in Fig. 4.

The self-loading refuse vehicle thus far described can be used with or without the mobile collecting container 10. When it is used without the container 10 the refuse is dumped directly into the hopper 13 from barrels, cans, boxes or the like, which can be emptied by being manually lifted up and fulcrummed on the sill 23, which is sufficiently low for that purpose.

For use with the container 10 the vehicle is provided with a special panel 31. The panel 31, which is shown in detail in Figs. 10 and 11, fits at its ends against the side edges of the opening 22 immediately above the sill 23 and forms in effect an upward continuation of the rear end 21 of the hopper. The panel 31 is provided at its lower edge with a rearwardly extending flange 32, and the rear edge of the flange 32 is hinged at 33 to brackets 34 at opposite sides of the vehicle. When the panel 31 is in the erected position shown in Figs. 10 and 11 it will remain in that position under the influence of gravity by reason of its rearwardly offset hinge mounting, but when the container 10 is not being used with the vehicle and the refuse is instead being dumped directly by hand into the hopper the panel is adapted to be swung rearwardly and downwardly into the out-of-the-way position shown in full lines in Fig. 4. The panel 31 is provided at its ends with brackets 35 to which the ends of links 36 are pivotally attached, and the links 36 are provided adjacent the free ends of the same with hook formations 37 for detachable connection with the container 10.

The container 10 is of laterally elongated rectangular cross section and is characterized by substantially flat parallel vertically extending end walls 37a, which end walls are spaced apart from each other a distance which is somewhat less than the horizontal width of the rectangular opening 22 in the hopper 13. The container is provided at the upper front corners of its end walls 37a with fixed axially aligned rod-like trunnions 38, which trunnions project laterally substantial distances beyond the end walls 37a and are provided adjacent their ends with axially spaced collar-like formations 38a. The spaced formations 38a serve to embrace and thereby position on the ends of the trunnions 38 the hook formations 37 of the links 36.

When refuse is brought to the vehicle in the mobile collection container 10, the panel 31 is swung upwardly from the full line position shown in Fig. 4 to the dotted line position shown in that view (if it is not already in its upwardly swung position) and the links 36 on the panel 31 are swung rearwardly and upwardly from the full line position shown in Fig. 5 to the dotted line position shown in that view to engage the hook formations 37 on the links with the trunnions 38 between the collar-like formations 38a, at whatever elevation the container then happens to be with relation to the vehicle. As soon as the trunnions 38 on the container have been fully engaged with the hook formations 37 on the links, sleeves 39 on the links are slid forwardly over the hook formations 37 to latch the links and trunnions securely together.

The loading mechanism of the vehicle is then operated to cause the transfer plate 14 to move from the position shown in Fig. 4 to the position shown in Fig. 5. Two cables 40, which are secured at their front ends to the plate 14 and which are provided at their rear ends with hooks 41, are then drawn out through the opening 22 into the position shown in Fig. 5 and hooked to projections 42 which are provided for that purpose on the end walls 37a of the container in rearwardly spaced relation to the trunnions 38. The cables 40 when connected with the projections 42 constitute flexible power-transmitting links between the loading mechanism and the container. The projections 42, which are provided at their outer ends with enlarged collar-like formations 42a, also form the front portions of U-shaped handles 43 on the ends of the container, for use in moving the container about from one place to another. The collar-like formations 42a assist in positioning and retaining the hooks 41 inwardly of the outer ends of the projections 42.

As soon as the cables 40 have been hooked in this manner to the container the loading mechanism of the vehicle is again operated to cause the transfer plate 14 to move forwardly in the hopper from the position shown in Fig. 5 to the position shown in Fig. 9. During the first part of this movement the container 10 will be drawn forwardly toward the vehicle by the cables 40 into a position wherein short rearwardly projecting arms 44 on the panel 31 will abut with wear plates 45 on the front panel and prevent further forward movement of the container. At the same time the container 10 will be lifted by reason of the latched engagement of the links 36 with the trunnions 38, as shown in Fig. 6.

As the forward movement of the plate 14 continues the container which has then been fully elevated by the links 36 will start to tilt forwardly, as shown in Fig. 7. This tilting movement will continue, as shown in Fig. 8, until the plate 14 reaches the position shown in Fig. 9, with the links 36 on which the container is being pivotally supported moving into an upright position, at which time the plate 14 will come to rest with the container tilted up far enough to discharge all of its contents into the hopper behind the plate 14.

After the container 10 has been inverted to deposit its contents in the hopper 13 the container can be retrieved by again starting the loading mechanism and causing the transfer plate 14 to return from the position shown in Fig. 9 to the position shown in Fig. 5. When the plate 14 reaches the position shown in Fig. 5 and comes to rest there, with the empty container back in its starting position, the links 36 and cables 40 can be quickly released from the empty container and can be connected up with another filled container, either at the same location or at some other point along the route.

Instead of substituting the empty container 10 for another filled one, the same container can remain attached to the links 36 and cables 40, and can be repeatedly filled by hand and dumped, without being disconnected from the vehicle. If it is desired to use the same container in this way at more than one place along the route the container can be raised up into the position shown in Fig. 9 and kept in that position while the vehicle is in transit.

If it is desired to use the vehicle in the customary way, i.e. by loading the hopper 13 by hand, the vehicle can be readily changed back by lowering the panel 31 from the dotted line position shown in Fig. 4 to the full line position shown in that view. The rearwardly projecting arms 44 on the panel 31, which are adapted to engage with the wear plates 45 on the container 10, are pivotally attached to brackets 46 on the panel adjacent the ends of the latter, in such manner that the arms 44 will drop down by gravity into a non-obstructing position when the panel is lowered into the position shown in full lines in Fig. 4.

The power operated loading mechanism of the vehicle is provided with automatic control means of any suitable type (not shown), which control means can be set to cause the cycle of movement of the transfer plate 14 to start and stop, either in the position of the plate shown in Fig. 4 for hand loading, or in the position of the plate shown in Fig. 5 for container loading.

The container 10, of which there may be and preferably are several of the same construction located at different points along the route, where they may be filled over a period of time and await the arrival of the vehicle, is mounted on swivel caster wheels 47 and is provided with a cover 48 for the top thereof. The cover 48 is hinger at 49 to the rear upper edge of the container so as not to cause interference during the elevation and tilting of the container.

I claim:

1. In a self-loading vehicle of the type having a storage chamber, a loading hopper, an opening above the hopper through which material is adapted to be dumped into the hopper, mechanism for transferring the material from the hopper into the chamber, and means for operating said mechanism; the provision of a mobile collecting container which is adapted when filled with material to be brought into association with the vehicle and manipulated to dump its contents through the opening into the hopper, means for detachably connecting the container with the vehicle, and means for detachably connecting the container with said mechanism, whereby when said mechanism is operated the container will be raised and tilted through the opening, said second mentioned connecting means comprising cables which are connected with said mechanism and are provided with hooks which are adapted to be engaged with formations on the container at points spaced from the first mentioned connecting means.

2. In a self-loading vehicle of the type having a storage chamber, a loading hopper, an opening above the hopper through which material is adapted to be dumped into the hopper, mechanism for transferring the material from the hopper into the chamber, and means for operating said mechanism; the provision of a mobile collecting container which is adapted when filled with material to be brought into association with the vehicle and manipulated to dump its contents through the opening into the hopper, means for detachably connecting the container with the vehicle, and means for detachably connecting the container with said mechanism, whereby when said mechanism is operated the container will be raised and tilted through the opening, said first mentioned connecting means comprising trunnions on the ends of the container, and rigid arms which are pivotally mounted at corresponding ends on the vehicle and which are provided adjacent their opposite ends with means for rotatably securing the arms to the trunnions, said second mentioned connecting means comprising flexible cables which are connected with said mechanism and are provided with hooks which are adapted to be connected with formations on the container at points spaced from the trunnions.

3. In a self-loading vehicle of the type having a storage chamber, a loading hopper behind the storage chamber, and an opening behind the hopper through which material is adapted to be dumped into the hopper, mechanism for transferring the material from the hopper into the chamber, and means for operating said mechanism; the provision of a panel behind the hopper adjacent the lower edge of the opening, which panel is hinged along its lower edge and is swingable upwardly from a depending position into an upright position across the lower portion of the opening to increase the effective size of the hopper, said panel being provided with arms which are hinged at corresponding ends to the panel and which are provided at their other ends with means for detachably pivoting the arms on a mobile container which is adapted to be brought into position against the panel in the upright position of the latter and raised and tilted on the arms, and said mechanism being provided with means for detachable engagement with the container, whereby when the mechanism is operated the container will be raised and tilted on the arms through the opening above the panel.

4. In a self-loading vehicle of the type having a storage chamber, a loading hopper at the rear end of the chamber, an opening in the rear end of the hopper through which material is adapted to be dumped into the hopper, movable mechanism for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism, whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper.

5. In a self-loading vehicle of the type having a storage chamber, a loading hopper at the rear end of the chamber, an opening in the rear end of the hopper through which material is adapted to be dumped into the hopper, movable mechanism in the hopper for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism through the opening in the hopper, whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper.

6. In a self-loading vehicle of the type having a storage chamber, a loading hopper at the rear end of the chamber, an opening in the rear end of the hopper through which material is adapted to be dumped into the hopper, movable mechanism in the hopper for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism through the opening in the hopper whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper, said container being provided at the upper front corners thereof with laterally projecting trunnions for pivotal association with said first mentioned detachable connecting means and being provided in rearwardly spaced relation to said trunnions with laterally projecting formations for interlocking association with said second mentioned detachable connecting means.

7. In a self-loading vehicle of the type having a storage chamber, a loading hopper at the rear end of the chamber, an opening in the rear end of the hopper through which material is adapted to be dumped into the hopper, movable mechanism in the hopper for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism through the opening in the hopper, whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper, said container being provided at the upper front corners thereof with laterally projecting trunnions for pivotal association with said first mentioned detachable connecting means and being provided in rearwardly spaced relation to said trunnions with laterally projecting formations for interlocking association with said second mentioned detachbale connecting means, and said laterally projecting formations being provided with hand grip portions which extend rearwardly from the same in spaced generally parallel relation to the container.

8. In a self-loading vehicle of the type having a storage chamber, a loading hopper at the rear end of the chamber, an opening in the rear end of the hopper through which material is adapted to be dumped into the hopper, movable mechanism in the hopper for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism through the opening in the hopper, whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper, said first mentioned connecting means including trunnions on the upper front corners of the container, and rigid spacer arms between the container and the hopper, which arms are pivotally mounted at their inner ends on the rear end of the hopper at points closely adjacent the lower edge of the opening and are provided adjacent their outer ends with means for pivotal engagement with the trunnions on the container, whereby to cause the arms to swing upwardly and the container to rotate relative to the outer ends of the arms when the container is acted on by said movable mechanism through said second mentioned connecting means.

9. In a self-loading vehicle of the type having a storage chamber, a loading hopper at the rear end of the chamber, an opening in the rear end of the hopper through which material is adapted to be dumped into the hopper, movable mechanism in the hopper for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism through the opening in the hopper, whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper, said second mentioned connecting means comprising pulling links which are adapted to be connected between said movable mechanism and the container at points spaced rearwardly from the upper front corners of the latter.

10. In a self-loading vehicle of the type having a storage chamber, a loading hopper at the rear end of the chamber, an opening in the rear end of the hopper through which material is adapted to be dumped into the hopper, movable mechanism in the hopper for transferring any material in the hopper forwardly from the hopper into the chamber, and means for moving said mechanism; the provision of a mobile open top collecting container which is adapted when filled with material to be brought into association with the rear end of the hopper and tilted to dump its contents through the opening into the hopper, means for detachably connecting the container with the rear end of the hopper to permit of the container's being tilted relative to the hopper, and means for detachably connecting the container with said movable mechanism through the opening in the hopper, whereby when said mechanism is moved to transfer material from the hopper into the chamber it will at the same time act on the container through said second mentioned detachable connecting means to tilt the container into an inverted position in the opening to cause the contents of the container to be dumped through the open top of the container into the hopper, said second mentioned connecting means comprising flexible pulling links which are adapted to be passed through the opening in the hopper and connected between said movable mechanism and the container at points spaced rearwardly from the upper front corners of the latter.

11. A mobile open top collecting container for use in conjunction with a self-loading vehicle of the type having a storage chamber, a loading hopper at the rear end of the chamber and an opening in the rear end of the hopper through which material is adapted to be dumped into the hopper, which container is adapted to be moved into a position behind the loading hopper into dumping relation to the opening in the latter, said container being of laterally elongated rectangular cross section and being characterized by substantially flat parallel vertically extending end walls, said container being provided adjacent the upper front corners of said end walls with fixed axially aligned rod-like trunnions, which trunnions project outwardly a substantial distance beyond said end walls and are adapted for rotatable connection with members on the vehicle for rotatably supporting the weight of the container while the container is being rotated about said trunnions in being dumped, and said container being further provided on said end walls in rearwardly spaced relation to said trunnions with fixed formations, which formations are adapted to be connected with power operating means associated with the vehicle to effect the dumping.

12. A mobile open top collecting container for use in conjunction with a self-loading vehicle of the type having a storage chamber, a loading hopper at the rear end of the chamber and an opening in the rear end of the hopper through which material is adapted to be dumped into the hopper, which container is adapted to be moved into a position behind the loading hopper into dumping relation to the opening in the latter, said container being of laterally elongated rectangular cross section and being characterized by substantially flat parallel vertically extending end walls, said container being provided adjacent the upper front corners of said end walls with fixed axially aligned rod-like trunnions, which trunnions project outwardly a substantial distance beyond said end walls and are adapted for rotatable connection with members on the vehicle for rotatably supporting the weight of the container while the container is being rotated about said trunnions in being dumped, and said container being further provided on said end walls in rearwardly spaced relation to said trunnions with fixed formations, which formations also project outwardly beyond said end walls and are adapted to be connected with power operating means associated with the vehicle to effect the dumping, said outwardly projecting formations being in turn provided at their outer ends with hand grip portions, which portions extend rearwardly from said formations in spaced generally parallel relation to the end walls of the container.

13. A mobile open top collecting container for use in conjunction with a self-loading vehicle of the type having a storage chamber, a loading hopper at the rear end of the chamber and an opening in the rear end of the hopper through which material is adapted to be dumped into the hopper, which container is adapted to be moved into a position behind the loading hopper into dumping relation to the opening in the latter, said container being of laterally elongated rectangular cross section and being characterized by substantially flat parallel vertically extending end walls, said container being provided adjacent the upper front corners of said end walls with fixed axially aligned rod-like trunnions, which trunnions project outwardly a substantial distance beyond said end walls and are adapted for rotatable connection with members on the vehicle for rotatably supporting the weight of the container while the container is being rotated about said trunnions in being dumped, and which trunnions are provided on the outer ends of the same beyond said end walls with collars for positioning the trunnions axially with respect to the members on the vehicle with which the trunnions are adapted to be rotatably connected, and said container being further provided on said end walls in rearwardly spaced relation to said trunnions with fixed formations, which formations are adapted to be connected with power operating means associated with the vehicle to effect the dumping.

References Cited in the file of this patent

UNITED STATES PATENTS

| | | |
|---|---|---|
| 1,820,526 | Caldwell | Aug. 25, 1931 |
| 2,124,624 | Leach et al. | July 26, 1938 |
| 2,314,647 | Longenecker | Mar. 23, 1943 |
| 2,590,256 | Linde | Mar. 25, 1952 |
| 2,847,135 | Galloway | Aug. 12, 1958 |

FOREIGN PATENTS

| | | |
|---|---|---|
| 563,882 | France | Oct. 5, 1923 |
| 1,053,150 | France | Sept. 30, 1953 |